United States Patent
Lee et al.

(10) Patent No.: US 11,576,226 B2
(45) Date of Patent: Feb. 7, 2023

(54) METHOD FOR REQUESTING RRC CONNECTION AND APPARATUS SUPPORTING SAME

(71) Applicant: LG Electronics Inc., Seoul (KR)

(72) Inventors: Youngdae Lee, Seoul (KR); Bokyung Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 75 days.

(21) Appl. No.: 16/612,337

(22) PCT Filed: May 9, 2018

(86) PCT No.: PCT/KR2018/005302
§ 371 (c)(1),
(2) Date: Nov. 8, 2019

(87) PCT Pub. No.: WO2018/208076
PCT Pub. Date: Nov. 15, 2018

(65) Prior Publication Data
US 2021/0160951 A1 May 27, 2021

Related U.S. Application Data

(60) Provisional application No. 62/044,429, filed on May 10, 2017.

(51) Int. Cl.
*H04W 76/27* (2018.01)
*H04W 76/19* (2018.01)

(52) U.S. Cl.
CPC .......... *H04W 76/27* (2018.02); *H04W 76/19* (2018.02)

(58) Field of Classification Search
CPC ..... H04W 76/27; H04W 76/19; H04W 80/02; H04W 76/10
See application file for complete search history.

(56) References Cited

U.S. PATENT DOCUMENTS

2008/0089285 A1* 4/2008 Pirskanen ............. H04L 1/1621
370/329
2009/0163211 A1* 6/2009 Kitazoe ............... H04W 12/106
455/436

(Continued)

FOREIGN PATENT DOCUMENTS

EP 3193537 7/2017
KR 1020100103622 9/2010

(Continued)

OTHER PUBLICATIONS

CATT, "Service Triggered Network Slice Selection Procedure," S2-163980, SA WG2 Meeting #116, Vienna, Austria, dated Jul. 11-15, 2016, 7 pages.

(Continued)

*Primary Examiner* — Will W Lin
(74) *Attorney, Agent, or Firm* — Fish & Richardson P.C.

(57) ABSTRACT

Disclosed are a method for requesting an RRC connection and an apparatus supporting same. The method comprises the steps of: generating a message for an RRC connection request; generating a header including an indicator indicating a use relating to the RRC connection request of the generated message, and generating a medium access control protocol data unit (MAC PDU) including the generated message; and transmitting the generated MCA PDU to a base station.

7 Claims, 11 Drawing Sheets

(56) References Cited

U.S. PATENT DOCUMENTS

| | | | | |
|---|---|---|---|---|
| 2012/0243489 | A1* | 9/2012 | Pirskanen | H04W 8/26 370/328 |
| 2014/0036685 | A1* | 2/2014 | Kim | H04W 52/0216 370/236 |
| 2016/0050601 | A1 | 2/2016 | Jeong et al. | |
| 2017/0208510 | A1* | 7/2017 | Pudney | H04W 8/22 |
| 2017/0318606 | A1* | 11/2017 | Lee | H04W 72/14 |
| 2017/0332419 | A1* | 11/2017 | Kim | H04L 1/1861 |
| 2018/0206290 | A1* | 7/2018 | Dai | H04W 76/27 |
| 2018/0270716 | A1* | 9/2018 | Takahashi | H04W 36/0033 |
| 2019/0014465 | A1* | 1/2019 | Wang | H04W 74/002 |
| 2019/0182639 | A1* | 6/2019 | Basu Mallick | H04W 4/40 |
| 2019/0230621 | A1* | 7/2019 | Dai | H04W 12/106 |
| 2020/0029237 | A1* | 1/2020 | Kim | H04W 68/02 |

FOREIGN PATENT DOCUMENTS

| | | |
|---|---|---|
| WO | WO2009/086188 | 7/2009 |
| WO | WO2017061111 | 4/2017 |

OTHER PUBLICATIONS

3rd Generation Partnership Project; Technical Specification Group Radio Access Network; Evolved Universal Terrestrial Radio Access (E-UTRA); "Radio Resource Control (RRC); Protocol specification (Release 14)," 3GPP TS 36.331 V14.2.0, dated Mar. 2017, 721 pages.

Sony, "UE capability in NR RRC connection request," R2-1703282, 3GPP TSG RAN WG2 Meeting #97bis, Spokane, USA, Apr. 3-7, 2017, 4 pages.

Chandrashekar et al., "5G Multi-RAT Multi-Connectivity Architecture," IEEE International Conference on Communications Workshops (ICC), dated Jul. 7, 2016, 9 pages.

$3^{rd}$ Generation Partnership Project; CATT; "Service Triggered Network Slice Selection Procedure," S2-163980, SA WG2, Vienna, Austria, dated Jul. 2016, 7 pages.

$3^{rd}$ Generation Partnership Project; Technical Specification Group Services and System Aspects; "Enhancements of Dedicated Core Networks selection mechanism (Release 14)," 3GPP TR 23.711 V14.0.0, dated Sep. 2016, 36 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); "Overall description; Stage 2 (Release 14)," 3GPP TS 36.300 V14.2.0, dated Mar. 2017, 330 pages.

3rd Generation Partnership Project; Technical Specification Group Radio Access Network; Evolved Universal Terrestrial Radio Access (E-UTRA); "Medium Access Control (MAC) protocol specification (Release 14)," 3GPP TS 36.321 V14.2.0, dated Mar. 2017, 96 pages.

3rd Generation Partnership Project; Technical Specification Group Radio Access Network; Evolved Universal Terrestrial Radio Access (E-UTRA); "Medium Access Control (MAC) protocol specification (Release 14)," 3GPP TS 36.321 V14.2.0, dated Mar. 2017, 106 pages.

Extended European Search Report in European Appln. No. 18797748.3, dated Mar. 12, 2020, 17 pages.

* cited by examiner

METHOD FOR REQUESTING RRC CONNECTION AND APPARATUS SUPPORTING SAME

CROSS-REFERENCE TO RELATED APPLICATIONS

This application is a National Stage application under 35 U.S.C. § 371 of International Application No. PCT/KR2018/005302, filed on May 9, 2018, which claims the benefit of U.S. Provisional Application No. 62/504,429, filed on May 10, 2017. The disclosures of the prior applications are incorporated by reference in their entirety.

BACKGROUND OF THE DISCLOSURE

Field of the Disclosure

The present disclosure relates to a technique for requesting an RRC connection in NR.

Related Art

In order to meet the demand for wireless data traffic since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

In order to achieve a high data rate, it is considered to implement a super high frequency (millimeter wave (mm-Wave)) band, e.g., 60 GHz band, in the 5G communication system. To decrease a propagation loss of a radio wave and increase a transmission distance in the super high frequency band, beamforming, massive multiple-input multiple-output (MIMO), Full Dimensional MIMO (FD-MIMO), array antenna, analog beamforming, and large scale antenna techniques are discussed in the 5G communication system.

RRC connection requests may include an RRC connection request, an RRC connection reestablishment request, an RRC connection resumption request, and the like, each of which have different cause values. A network may predict which operation will be subsequently performed by a UE or which message will be subsequently transmitted from the UE on the basis of a cause value. Accordingly, the network and the UE need to distinguish the messages including the respective cause values.

SUMMARY OF THE DISCLOSURE

RRC messages include, for example, an RRC connection request message, an RRC connection reestablishment request message, an RRC connection resumption request message, and the like. All of these messages are for requesting an RRC connection but have different purposes and different cause values. To save radio resources, a method for integrating messages for performing similar operations is proposed. To this end, there is a need for a method for integrating messages into a single message and enabling a base station to recognize each purpose without increasing the capacity of the integrated message.

In the coexistence of a 4G core network and a 5G core network, a base station cannot know a core network to which a UE intends to connect. Accordingly, a method for reporting the type of a core network to which a UE intends to connect to a base station when the UE intends to establish an RRC connection is required.

According to one embodiment of the present disclosure, there is provided a method for requesting a radio resource control (RRC) connection by a user equipment (UE) in a wireless communication system, the method including: generating a message for an RRC connection request; generating a medium access control protocol data unit (MAC PDU) including a header including an indicator indicating a purpose associated with the RRC connection request of the generated message and the generated message; and transmitting the generated MAC PDU to a base station.

The indicator may correspond to a logical channel identity (LCID).

The message may be used for any one of an initial RRC connection request, an RRC connection reestablishment request, and an RRC connection resumption request.

The purpose associated with the RRC connection request may be at least one of an initial RRC connection request, an RRC connection reestablishment request, and an RRC connection resumption request.

According to another embodiment of the present disclosure, there is provided a method for requesting a radio resource control (RRC) connection by a user equipment (UE) in a wireless communication system, the method including: generating a message for an RRC connection request; generating a medium access control protocol data unit (MAC PDU) including a header including an indicator indicating a type of a core network associated with the generated message and the generated message; and transmitting the generated MAC PDU to a base station.

The indicator may correspond to a logical channel identity (LCID).

The type of the core network may be determined according to a non-access stratum (NAS) type of the UE by which the RRC connection request is triggered.

The NAS type may be any one of 4G-NAS and 5G-NAS.

The type of the core network may indicate any one of a 4G-EPC and a 5G-core network (CN).

According to still another embodiment of the present disclosure, there is provided a user equipment (UE) for requesting a radio resource control (RRC) connection in a wireless communication system, the UE including: a memory; a transceiver; a processor to connect the memory and the transceiver, wherein the processor is configured to: generate a message for an RRC connection request; generate a medium access control protocol data unit (MAC PDU) including a header including an indicator indicating a type of a core network associated with the generated message and the generated message; and transmit the generated MAC PDU to a base station.

The indicator may correspond to a logical channel identity (LCID).

The type of the core network may be determined according to a non-access stratum (NAS) type of the UE by which the RRC connection request is triggered.

The NAS type may be any one of 4G-NAS and 5G-NAS.

The type of the core network may indicate any one of a 4G-EPC and a 5G-core network (CN).

According to yet another embodiment of the present disclosure, there is provided a user equipment (UE) for requesting a radio resource control (RRC) connection in a wireless communication system, the UE including: a memory; a transceiver; a processor to connect the memory and the transceiver, wherein the processor is configured to: generate a message for an RRC connection request; generate a medium access control protocol data unit (MAC PDU) including a header including an indicator indicating a purpose associated with the RRC connection request of the generated message and the generated message; and transmit the generated MAC PDU to a base station.

According to embodiments of the present disclosure, an RRC connection establishment request message, an RRC connection reestablishment request message, an RRC connection resumption request message, and the like may be integrated into a single message, thereby simplifying a procedure. Further, an indicator indicating the purpose of each message may be attached to the integrated message, thereby reducing the capacity of the message.

In addition, according to embodiments of the present disclosure, in NR, an indicator indicating the type of a core network associated with an RRC connection request message may be attached to the RRC connection request message, enabling a base station to easily determine the type of the core network to which the UE intends to connect.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A and 5G. However, technical features of the present disclosure are not limited thereto.

Figure 1:
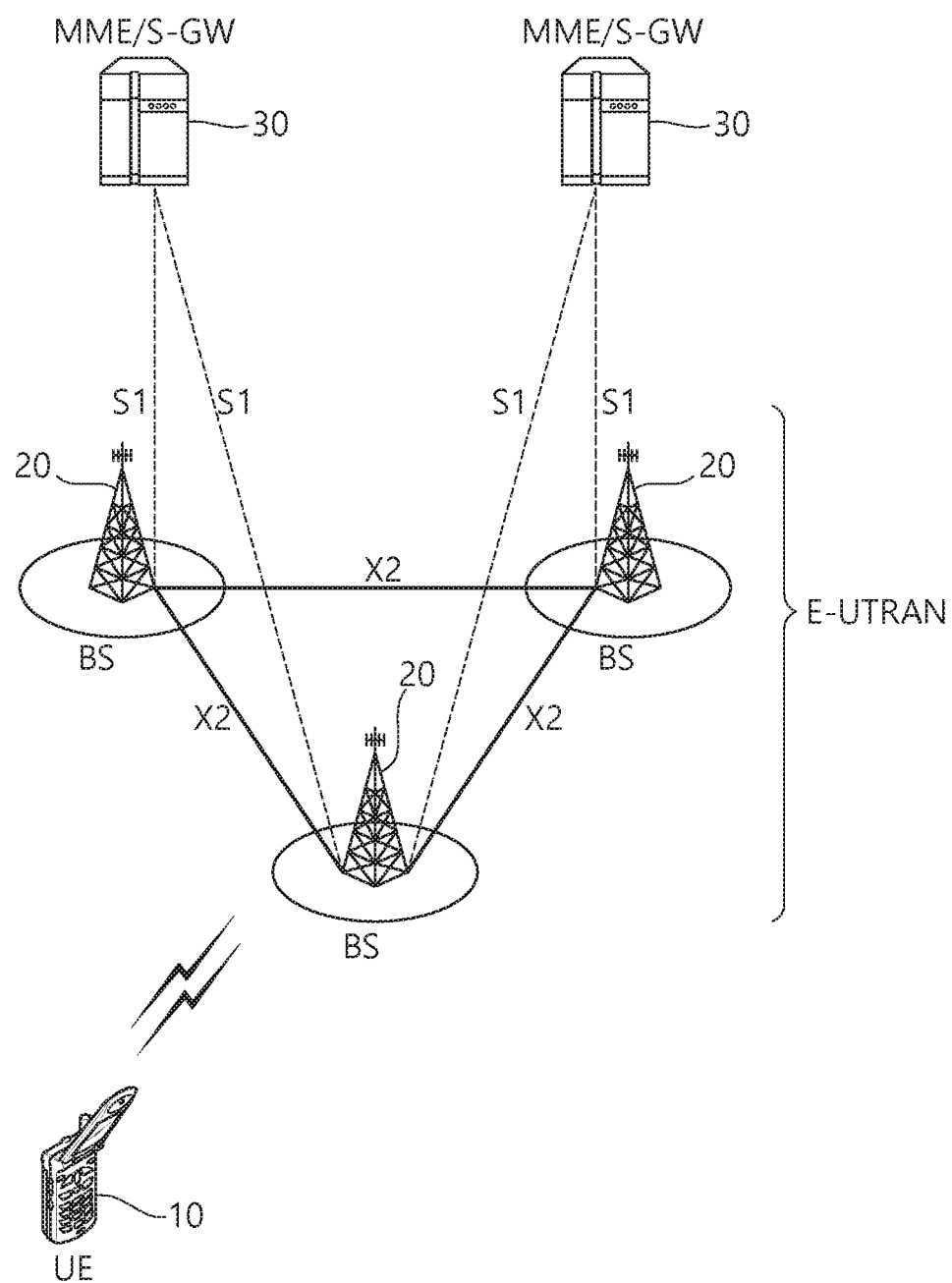
FIG. 1 shows the architecture of an LTE system.

FIG. 1 shows the architecture of an LTE system. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
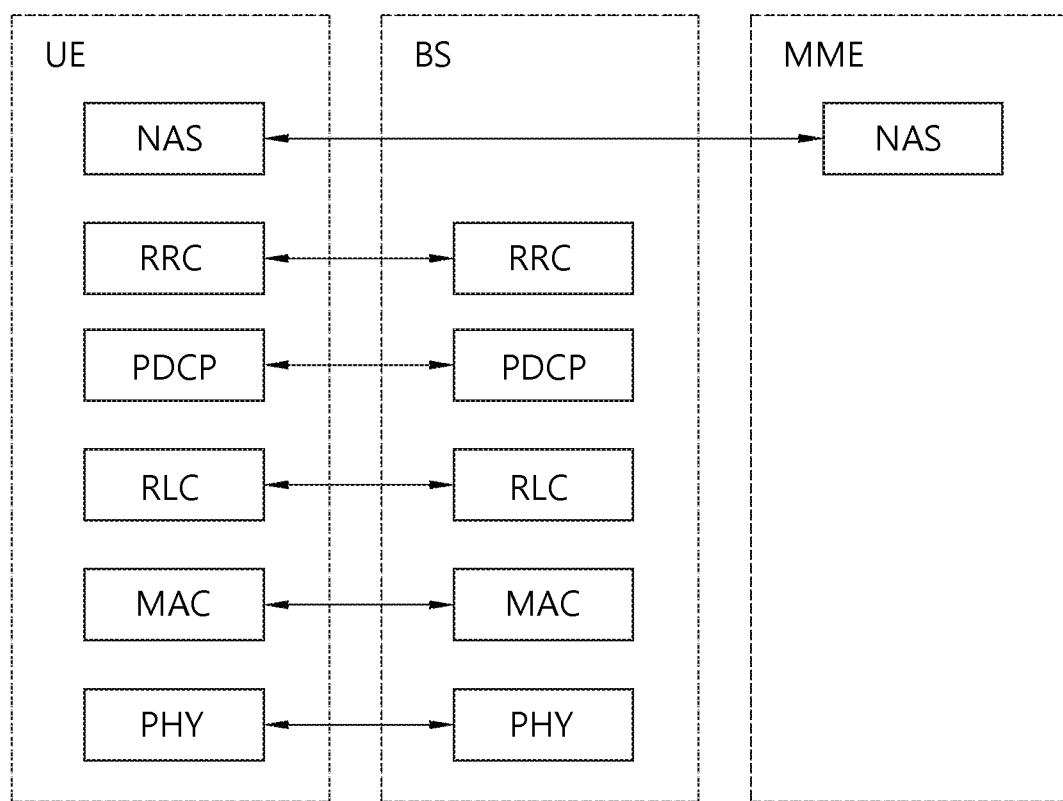
FIG. 2 shows a control plane of a radio interface protocol of an LTE system.
Figure 3:
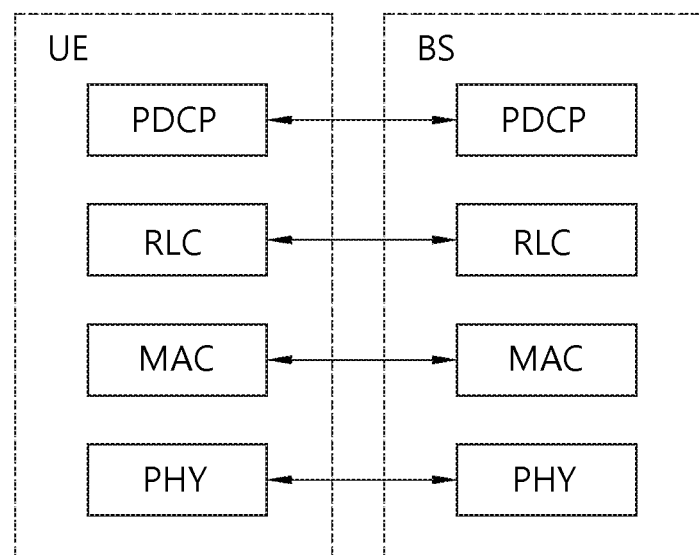
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

Referring to FIG. 2, the RLC and MAC layers (terminated in the eNB on the network side) may perform functions such as scheduling, automatic repeat request (ARQ), and hybrid automatic repeat request (HARM). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, RRC state of UE and RRC connection method is described below.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

In order to manage the mobility of the terminal in the NAS layer positioned on the control planes of the terminal and the MME, an EPS mobility management (EMM) registered state and an EMM deregistered state may be defined. The EMM registered state and the EMM deregistered state may be applied to the terminal and the MME. Like a case of turning on the power of the terminal for the first time, an initial terminal is in the EMM deregistered state and the terminal performs a process of registering the terminal in the corresponding network through an initial attach procedure in order to access the network. When the attach procedure is successfully performed, the terminal and the MME is transitioned to the EMM registered state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, a mobility of the UE is managed by the command of the network. If a location of the UE in the ECM-IDLE state becomes different from a location known to the network, the UE announces the location of the UE to the network through a tracking area update procedure.

Hereinafter, a 5G network structure is described.

Figure 4:
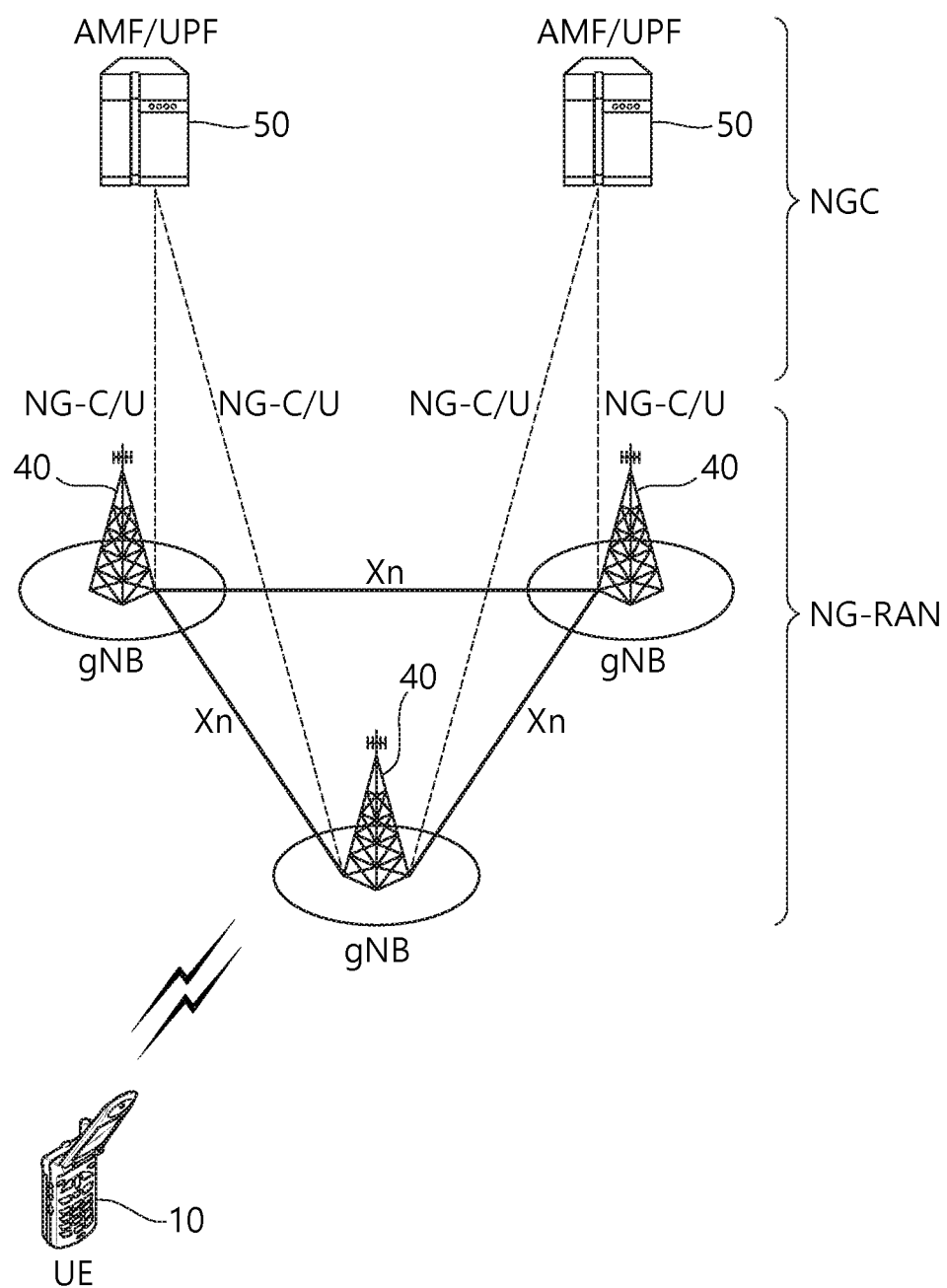
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE state of a UE is described.

In the discussion on the NR standardization, an RRC_INACTIVE state (RRC inactive state) has been newly introduced in addition to the existing RRC_CONNECTED state and RRC_IDLE state. The RRC_INACTIVE state may be a concept similar to a lightly connected mode or lightweight connection mode which is under discussion in LTE. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG2 interface between a gNB and am NGC or an S1 interface between an eNB and an EPC may be maintained. In the RRC_INACTIVE state, a core network recognizes that the UE is normally connected to a BS. The RRC_INACTIVE state and a lightly connected mode may be considered as practically identical.

In an E-UTRAN, a UE in the RRC_CONNECTED state cannot support a UE-based cell reselection procedure. However, a UE in the RRC_INACTIVE state can perform a cell reselection procedure, in which case the UE needs to report location information about the UE to the E-UTRAN.

In NR, a method of preventing the introduction of a plurality of messages that includes similar contents or is considered as similar by limiting the number of RRC messages has been proposed. Accordingly, how to combine and restrict RRC messages has been under discussion. One method for integrating a plurality of procedures into a single procedure is integrating a plurality of messages having similar contents and performing similar operations. For example, it is considered to integrate an RRC connection establishment procedure, an RRC connection reestablishment procedure, an RRC connection resumption procedure, and an RAN notification area update procedure into one procedure. However, request messages, such as an RRC connection request message, an RRC connection resumption request message, and an RRC connection reestablishment request message, have different cause values, a method for distinguishing the cause values in a single message is required.

When a UE supporting LTE is connected to a 5G core network, a 5G NAS protocol may be used. That is, an RRC layer of LTE may transmit both an LTE NAS message and an NR NAS message. Accordingly, a method for distinguishing between the LTE NAS message and the NR NAS message is required.

Hereinafter, a method for requesting an RRC connection according to an embodiment of the present disclosure will be described.

A first embodiment of the present disclosure proposes a method for distinguishing RRC messages using a logical channel ID (LCID).

There may be a plurality of methods for preventing the use of a large number of RRC messages by integrating a plurality of RRC messages into a single message. However, a direct method is integrating messages relating to the same or similar procedures. For example, it is possible to integrate request messages for switching to an RRC-connected state, but the request messages have different cause value as follows.

TABLE 1

| Existing message in LTE | Integrated message according to embodiment of the present disclosure | Field | Value |
| --- | --- | --- | --- |
| RRC connection request message | RRC connection request message | EstablishmentCause | emergency, highPriorityAccess, mt-Access, mo-Signalling, mo-Data, delayTolerantAccess-v1020, mo-VoiceCall-v1280, spare1 |
| RRC connection reestablishment request message | | ReestablishmentCause | reconfigurationFailure, handoverFailure, otherFailure, spare1 |
| RRC connection resumption request message | | ResumeCause | emergency, highPriorityAccess, mt-Access, mo-Signalling, mo-Data, delayTolerantAccess- |

TABLE 1-continued

| Existing message in LTE | Integrated message according to embodiment of the present disclosure | Field | Value |
|---|---|---|---|
| | | | v1020, mo-VoiceCall-v1280, spare1 |

Referring to Table 1, conventionally, the RRC connection request message, the RRC connection reestablishment request message, and the RRC connection resumption request message have different cause values. A network may predict which operation will be subsequently performed by a UE or which message will be subsequently transmitted from the UE on the basis of a cause value. Accordingly, the network and the UE need to distinguish the messages including the respective cause values. The present embodiment proposes one RRC connection request message into which an RRC connection request message, an RRC connection reestablishment request message, and an RRC connection resumption request message are integrated. However, when the integrated message includes all cause values corresponding to the respective purposes, the capacity of the RRC connection request message is increased, making it ineffective to integrate a plurality of messages. Therefore, a method is required for distinguishing actual purposes while maintaining the capacity of the integrated RRC connection request message.

In the present embodiment, when an RRC layer transmits an RRC message to an MAC layer, the RRC layer may report to the MAC layer that the message is an initial RRC connection request message. The MAC layer may attach a preset LCID to an MAC header. The LCID may be used as an indicator indicating the purpose of the RRC connection request. That is, the MAC layer may attach the LCID corresponding to the purpose of the message (initial RRC connection request) received from the RRC layer to the MAC header. If the RRC layer does not transmit any information related to the RRC message, the MAC layer may not attach any LCID to the message.

Table 2 shows each LCID indicating the purpose of an integrated message according to an embodiment of the present disclosure.

TABLE 2

| LCID | LCID value |
|---|---|
| 00000 | CCCH |
| 00001-01010 | ID of logical channel |
| 01011 | Initial RRC connection request |
| 01100 | RRC connection resumption request |
| 01101 | RRC connection reestablishment request |
| 01110-11000 | Reserved |

Referring to Table 2, indicators (LCD) of 01011, 01100, and 01101 correspond to an RRC connection request, an RRC connection resumption request, and an RRC connection reestablishment request, respectively. If an RRC connection request message is for an initial RRC connection, the MAC layer may attach 01011 as an MAC header to the RRC connection request message.

If an initial RRC connection request and an RRC connection resumption request have the same cause value, it is not necessary to distinguish the cause value d according to the initial RRC connection request or the RRC connection resumption request.

Figure 5:
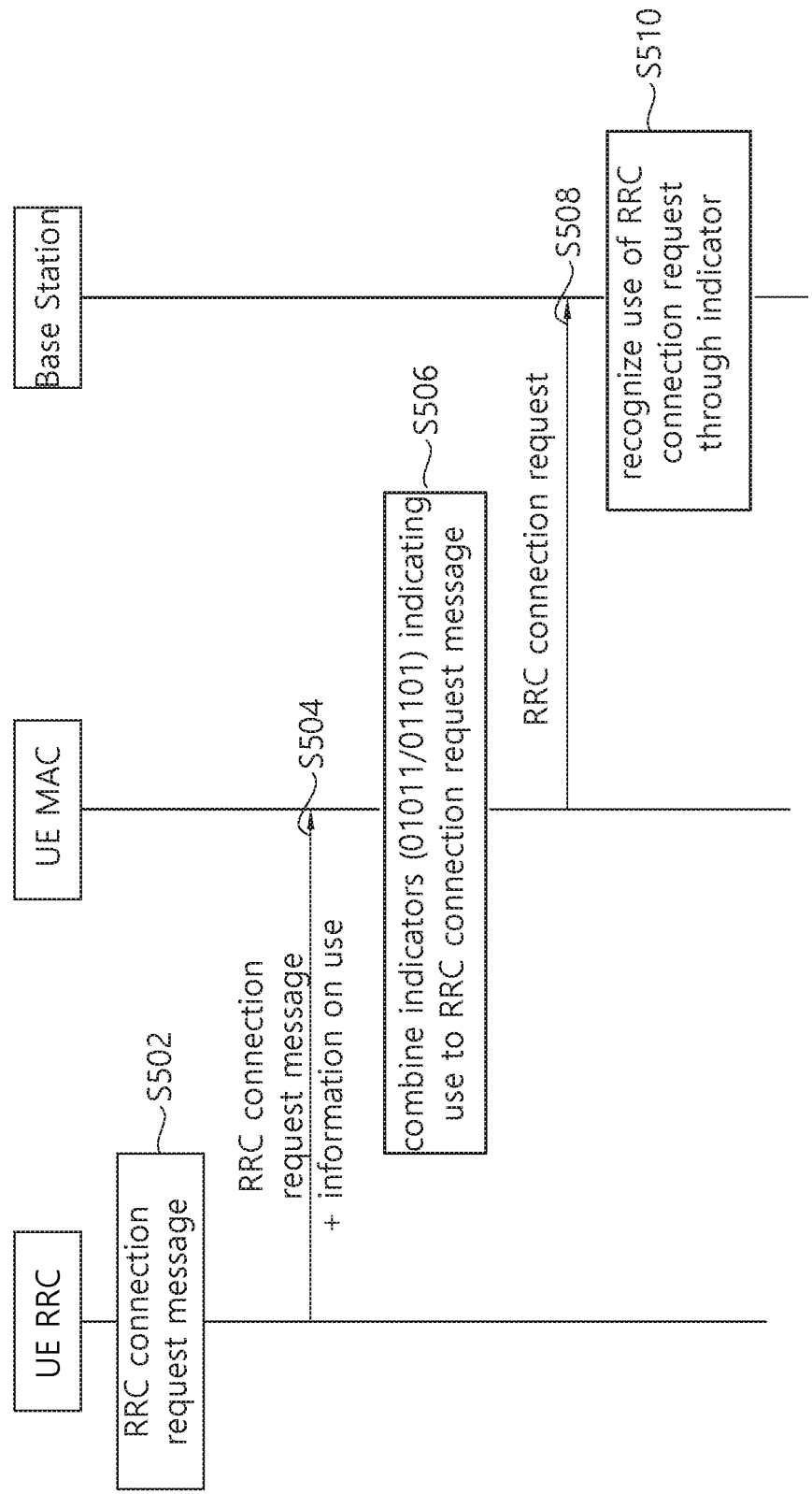
FIG. 5 illustrates a method for requesting an RRC connection according to a first embodiment of the present disclosure.

FIG. 5 illustrates a method for requesting an RRC connection according to the first embodiment of the present disclosure.

In step S502, an RRC layer of a UE may generate a message for an RRC connection request. Specifically, the RRC connection request may be for any one of an initial RRC connection establishment request, an RRC connection resumption request, and an RRC connection reestablishment request. However, the RRC layer may integrate RRC connection requests including these purposes to generate a single message. In this embodiment, one message into which RRC connection request messages used for different purposes are integrated is referred to as an integrated message hereinafter.

In step S504, the RRC layer of the UE may transmit the integrated message to an MAC layer of the UE. The RRC layer may report the purpose of the integrated message together with the integrated message to the MAC layer.

In step S506, the MAC layer of the UE may add an indicator indicating a purpose associated with the RRC connection request to the integrated message. That is, the MAC layer may combine an indicator corresponding to the initial RRC connection establishment request with the integrated message. Referring to Table 2, when the RRC connection request is for the initial RRC connection request, the MAC layer may combine an indicator of 01011 with the integrated message. When the RRC connection request is for the RRC connection resumption request, the MAC layer may combine an indicator of 01100 with the integrated message. When the RRC connection request is for the RRC connection reestablishment request, the MAC layer may combine an indicator of 01101 with the integrated message. The indicator may be combined, as a PDU header, with the integrated message to configure an MAC PDU. The indicator may be an LCID included in a header of the MAC PDU.

In step S508, the MAC layer of the UE may transmit the generated MAC PDU to a BS.

In step S510, the BS may recognize the purpose of the integrated message included in the MAC PDU on the basis of the indicator included in the received MAC PDU. According to this embodiment, when the integrated message is combined with the indicator of 01011, the BS may recognize that the RRC connection request is for the initial RRC connection request. When the integrated message is combined with the indicator of 01100, the BS may recognize that the RRC connection request is for the RRC connection resumption request. When the integrated message is combined with the indicator of 01101, the BS may recognize that the RRC connection request is for the RRC connection reestablishment request.

An LTE BS (eNB) may belong to a plurality of public land mobile networks (PLMNs), and each PLMN may be connected to only an EPC or both an EPC and a 5G-CN. An LTE BS supporting access to a 5G-CN may broadcast that the LTE BS can be connected to the 5G-CN. Therefore, a UE supporting a 5G-NAS may intend to connect to the 5G-CN through a corresponding cell. Further, a UE supporting only an LTE EPC may intend to connect to the EPC through a corresponding cell. That is, when a UE transmits an RRC connection request message to a BS, the UE may also transmit an already operating NAS protocol to the BS. However, the BS does not know which core network to connect to until receiving necessary information (e.g., information included in message 5) from the UE.

According to a second embodiment of the present disclosure, when NAS of the UE triggers RRC connection establishment, information about a currently operating NAS protocol may be notified to an RRC layer. The RRC layer may transmit an RRC message for RRC connection establishment along with the NAS protocol operating in the NAS layer to an MAC layer. The MAC layer may attach a preset LCID to an MAC header. Here, the LCID may be used as an index indicating whether the currently operating NAS protocol is LTE-NAS (4G-NAS) or 5G-NAS.

For example, when the 5G-NAS triggers RRC connection establishment to connect to a 5G-CN, the NAS layer may report that the NAS layer operates in the 5G-NAS. The RRC layer may transmit, to the MAC layer, information indicating that this RRC connection request is triggered by the 5G-NAS along with an RRC message for RRC connection establishment. The MAC layer may combine an LCID indicating the information indicating that the RRC connection request is triggered by the 5G-NAS with the RRC message. Then, upon receiving the message including the LCID, the BS can determine which CN the UE wants to connect to through the LCD.

If the information about the currently operating NAS protocol, that is, the LCID indicating that the NAS of the UE is 4G-NAS or 5G-NAS, is not received, the BS may attempt to connect to the EPC as in the existing LTE.

Figure 6:
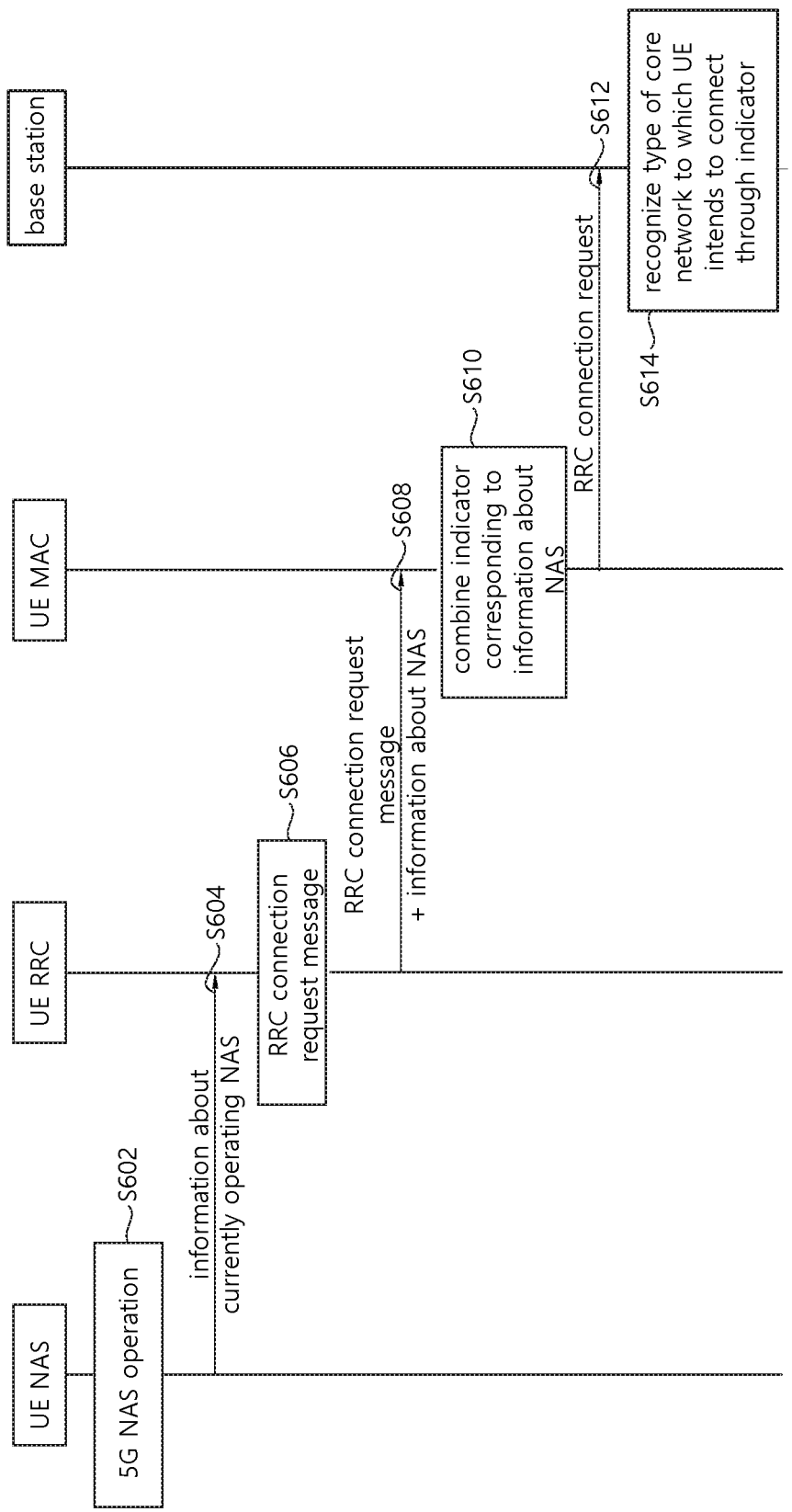
FIG. 6 illustrates a method for requesting an RRC connection according to a second embodiment of the present disclosure.

FIG. 6 illustrates a method for requesting an RRC connection according to the second embodiment of the present disclosure. In this embodiment, a UE may support both 4G-NAS and 5G-NAS. Hereinafter, it is assumed that an RRC connection request is triggered by 5G-NAS.

In step S602, an NAS layer of the UE may operate an NAS protocol. In one example, the NAS layer may be 5G-NAS. That is, an RRC connection request may be triggered by the 5G-NAS of the UE.

In step S604, the NAS layer of the UE may initiate an operation for attaching to a 5G-CN. Specifically, the NAS layer of the UE may transmit information about the operating NAS protocol to an RRC layer. The information about the NAS protocol may indicate the type of a core network to which the UE intends to connect. The type of the core network may be either a 4G core network (i.e., an EPC) or a 5G core network (5G-CN). In this embodiment, since the RRC connection request is triggered by the 5G-NAS of the UE, the information about the NAS protocol may indicate that the UE intends to connect to the 5G-CN.

In step S606, the RRC layer of the UE may generate an RRC connection request message.

In step S608, the RRC layer of the UE may transmit the RRC connection request message and the information about the NAS protocol to an MAC layer of the UE.

In step S610, the MAC layer of the UE may attach an indicator indicating the information about the NAS protocol to the RRC connection request message. Here, the indicator may be an LCID. That is, the MAC layer may combine the type of the core network to which the UE intends to connect, in the form of an LCID, with the RRC connection request message. The RRC connection request message to which the indicator is attached may be an MAC PDU.

In step S612, the MAC layer of the UE may transmit the RRC connection request message to which the indicator is attached to a BS.

In step S614, upon receiving the RRC connection request message to which the indicator is attached, the BS may recognize the type of the core network to which the UE intends to connect through the indicator. In this embodiment, the BS may recognize that the UE intends to access the 5G-CN through the LCID.

Figure 7:
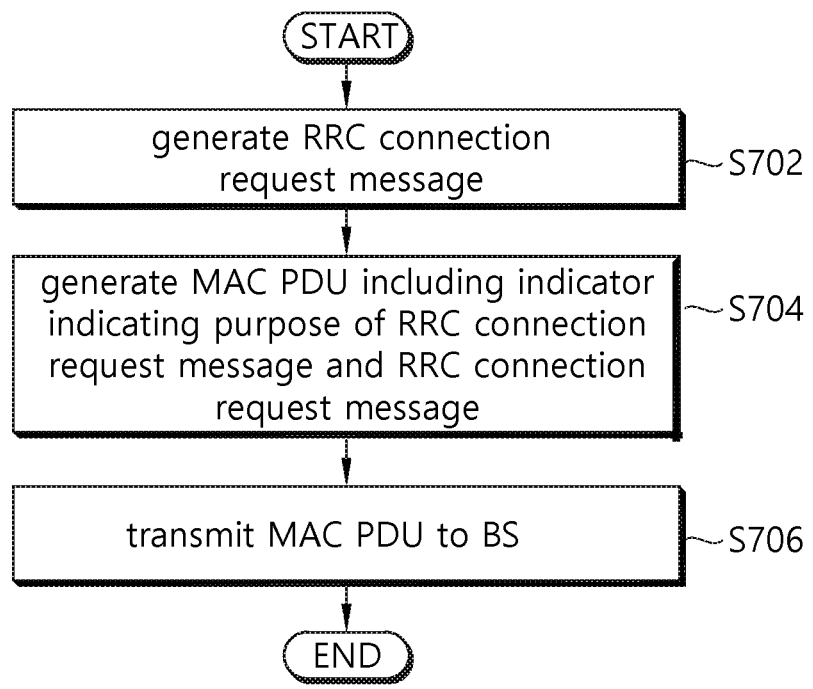
FIG. 7 is a flowchart illustrating a method for requesting an RRC connection according to the first embodiment of the present disclosure.

FIG. 7 is a flowchart illustrating a method for requesting an RRC connection according to the first embodiment of the present disclosure.

In step S702, a UE may generate a message for an RRC connection request. The message may be used for any one of an initial RRC connection request, an RRC connection reestablishment request, and an RRC connection resumption request.

In step S704, the UE may generate a medium access control protocol data unit (MAC PDU) including a header including an indicator indicating a purpose associated with the RRC connection request of the generated message and the generated message. The indicator may correspond to a logical channel identity (LCID). That is, the indicator may be represented by the LCD. The purpose associated with the RRC connection request may be at least one of the initial RRC connection request, the RRC connection reestablishment request, and the RRC connection resumption request.

In step S706, the UE may transmit the generated MAC PDU to a BS.

Figure 8:
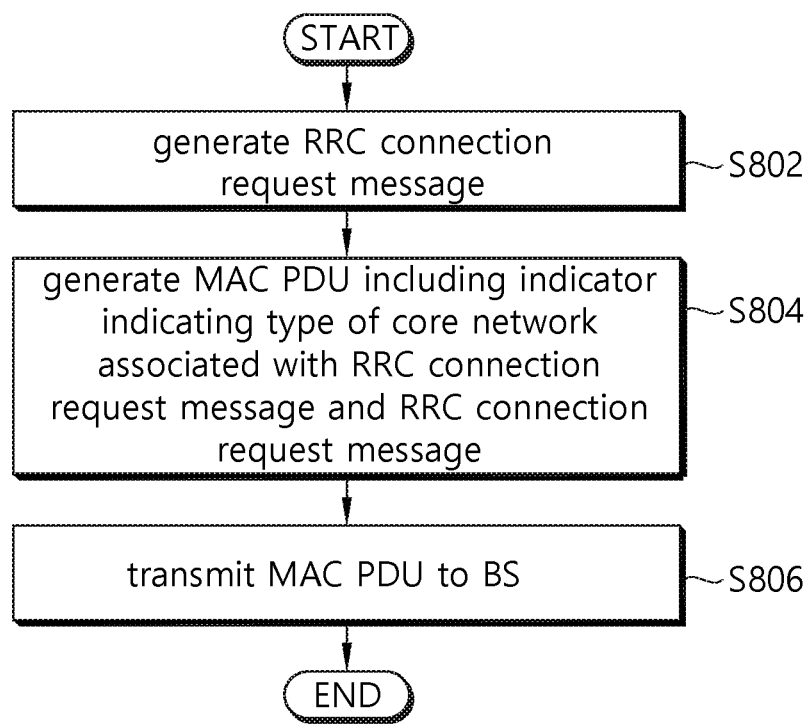
FIG. 8 is a flowchart illustrating a method for requesting an RRC connection according to the second embodiment of the present disclosure.

FIG. 8 is a flowchart illustrating a method for requesting an RRC connection according to the second embodiment of the present disclosure.

In step S802, a UE may generate a message for an RRC connection request.

In step S804, the UE may generate a medium access control protocol data unit (MAC PDU) including a header including an indicator indicating the type of a core network associated with the generated message and the generated message. The indicator may correspond to a logical channel identity (LCD). That is, the indicator may be represented by the LCD. The type of the core network may be determined according to the non-access stratum (NAS) type of the UE by which the RRC connection request is triggered. The NAS type may be any one of 4G-NAS and 5G-NAS. The type of the core network may indicate any one of a 4G-EPC and a 5G-CN.

In step S806, the UE may transmit the generated MAC PDU to a BS.

Figure 9:
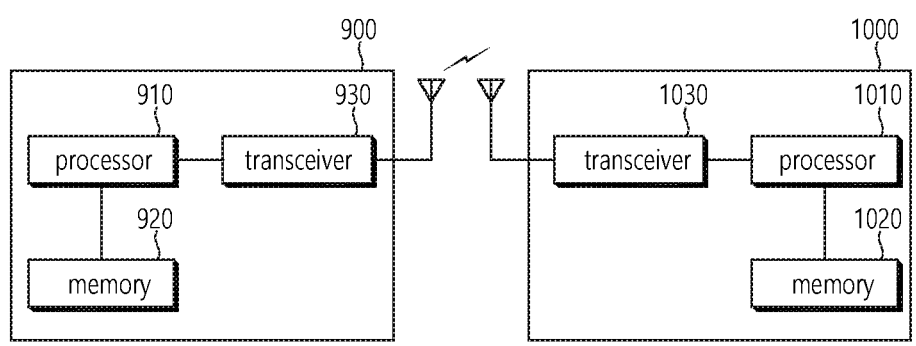
FIG. 9 illustrates a wireless communication system in which an embodiment of the present disclosure is implemented.

FIG. 9 illustrates a wireless communication system in which an embodiment of the present disclosure is implemented.

A UE 900 includes a processor 910, a memory 920, and a transceiver 930. The memory 920 is connected to the processor 910 and stores various pieces of information for driving the processor 910. The transceiver 1130 is connected to the processor 910 and transmits a radio signal to a network node 1000 or receives a radio signal from the network node 1000.

The processor 910 may be configured to implement the functions, processes, and/or methods described herein. Specifically, the processor 910 may control the transceiver 930 to perform steps S502 to S508 in FIG. 5. The processor 910 may control the transceiver 930 to perform steps S602 to S612 in FIG. 6.

The network node 1000 includes a processor 1010, a memory 1020, and a transceiver 1030. The network node 1000 may be any one of an eNB, a gNB, a ng-eNB, and an en-gNB. The network node 1000 may be either an MN or an SN described above. The memory 1020 is connected to the processor 1010 and stores various pieces information for driving the processor 1010. The transceiver 1030 is connected to the processor 1010 and transmits a radio signal to the UE 900 or receives a radio signal from the UE 900.

The processors 910 and 1010 may include an application-specific integrated circuit (ASIC), another chip set, a logical circuit, a data processing device, and/or a converter converting a baseband signal and a radio signal to and from one another. The memories 920 and 1020 may include a read-only memory (ROM), a random access memory (RAM), a flash memory, a memory card, a storage medium, and/or another storage device. The transceivers 930 and 1030 may include a baseband circuit to process a radio frequency signal. When the embodiments are implemented in software, the above-described methods may be implemented by modules (processes, functions, or the like) performing the above-described functions. The module may be stored in the memories 920 and 1020 and may be executed by the processors 910 and 1010. The memories 920 and 1020 may be located inside or outside of the processors 910 and 1010 and may be connected to the processors 910 and 1010 through a diversity of well-known means.

Figure 10:
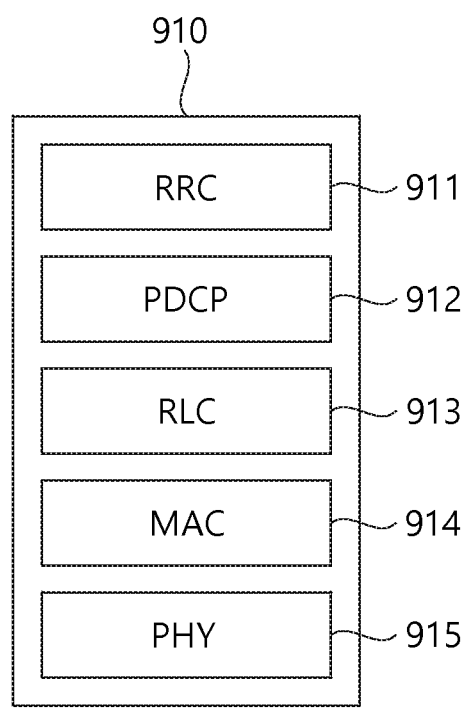
FIG. 10 shows a processor of a UE illustrated in FIG. 9.

FIG. 10 shows the processor of the UE illustrated in FIG. 9. An RRC layer 911, a PDCP layer 912, an RLC layer 913, an MAC layer 914, and a physical layer 915 may be implemented by the processor 910. The RRC layer 911 may be configured to implement the functions, processes, and/or methods of the processor 910.

Figure 11:
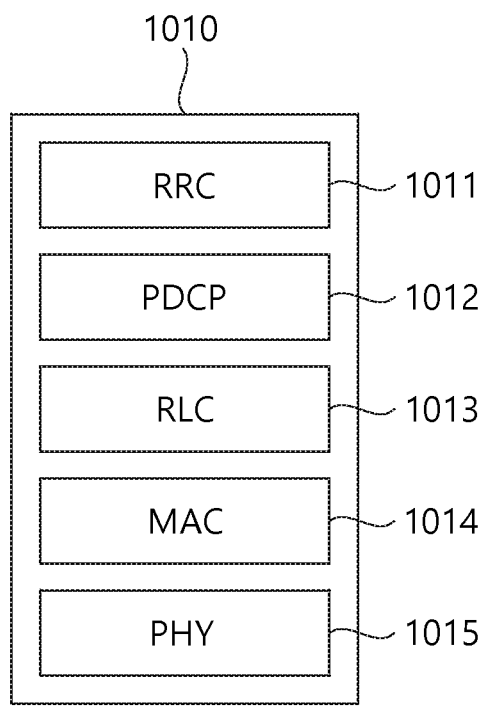
FIG. 11 shows a processor of a network node illustrated in FIG. 9.

FIG. 11 shows the processor of the network node illustrated in FIG. 9. An RRC layer 1011, a PDCP layer 1012, an RLC layer 1013, an MAC layer 1014, and a physical layer 1215 may be implemented by the processor 1010. The RRC layer 1011 may be configured to implement the functions, processes, and/or methods of the processor 1010.

In the system illustrated above, the foregoing methods that can be implemented according to the aspects of the disclosure are described on the basis of a flowchart. Although the methods are described on the basis of a series of operations or blocks for convenience, the aspects of the disclosure claimed herein are not limited to the order of the operations or blocks. Some operations or blocks may occur simultaneously or in a different order from other steps or blocks as described above. Further, those skilled in the art will understand that the operations shown in the above flowcharts are not exclusive, that further operations may be included, or that one or more operations in the flowcharts may be deleted without affecting the scope of the present disclosure.

What is claimed is:

1. A method for requesting a radio resource control (RRC) connection by a user equipment (UE) in a wireless communication system, the method comprising:
   generating a message for an RRC connection request;
   generating a medium access control protocol data unit (MAC PDU) which comprises (i) a header including a logical channel identity (LCID) and (ii) the generated message; and
   transmitting the generated MAC PDU to a base station,
   wherein the LCID informs that a type of a core network associated with the generated message is (i) a first core network and/or (ii) a second core network which is installed later than the first core network, and
   wherein the type of the core network is determined according to a non-access stratum (NAS) type of the UE by which the RRC connection request is triggered.

2. The method of claim 1, wherein the NAS type is any one of 4G-NAS and 5G-NAS.

3. The method of claim 1,
   wherein the first core network is a 4G-evolved packet core (EPC), and
   wherein the second core network is a 5G-core network (CN).

4. The method of claim 1, wherein the UE communicates with at least one of a mobile terminal, a network or autonomous vehicles other than the UE.

5. A user equipment (UE) for requesting a radio resource control (RRC) connection in a wireless communication system, the UE comprising:
   a memory;
   a transceiver;
   a processor to connect the memory and the transceiver,
   wherein the processor is configured to:
   generate a message for an RRC connection request;
   generate a medium access control protocol data unit (MAC PDU) which comprises comprise (i) a header including a logical channel identity (LCID) and (ii) the generated message; and
   transmit the generated MAC PDU to a base station,
   wherein the LCID informs that a type of a core network associated with the generated message is (i) a first core network and/or (ii) a second core network which is installed later than the first core network, and
   wherein the type of the core network is determined according to a non-access stratum (NAS) type of the UE by which the RRC connection request is triggered.

6. The UE of claim 5, wherein the NAS type is any one of 4G-NAS and 5G-NAS.

7. The UE of claim 5,
   wherein the first core network is a 4G-evolved packet core (EPC), and
   wherein the second core network is a 5G-core network (CN).

* * * * *